United States Patent Office 3,429,550
Patented Feb. 25, 1969

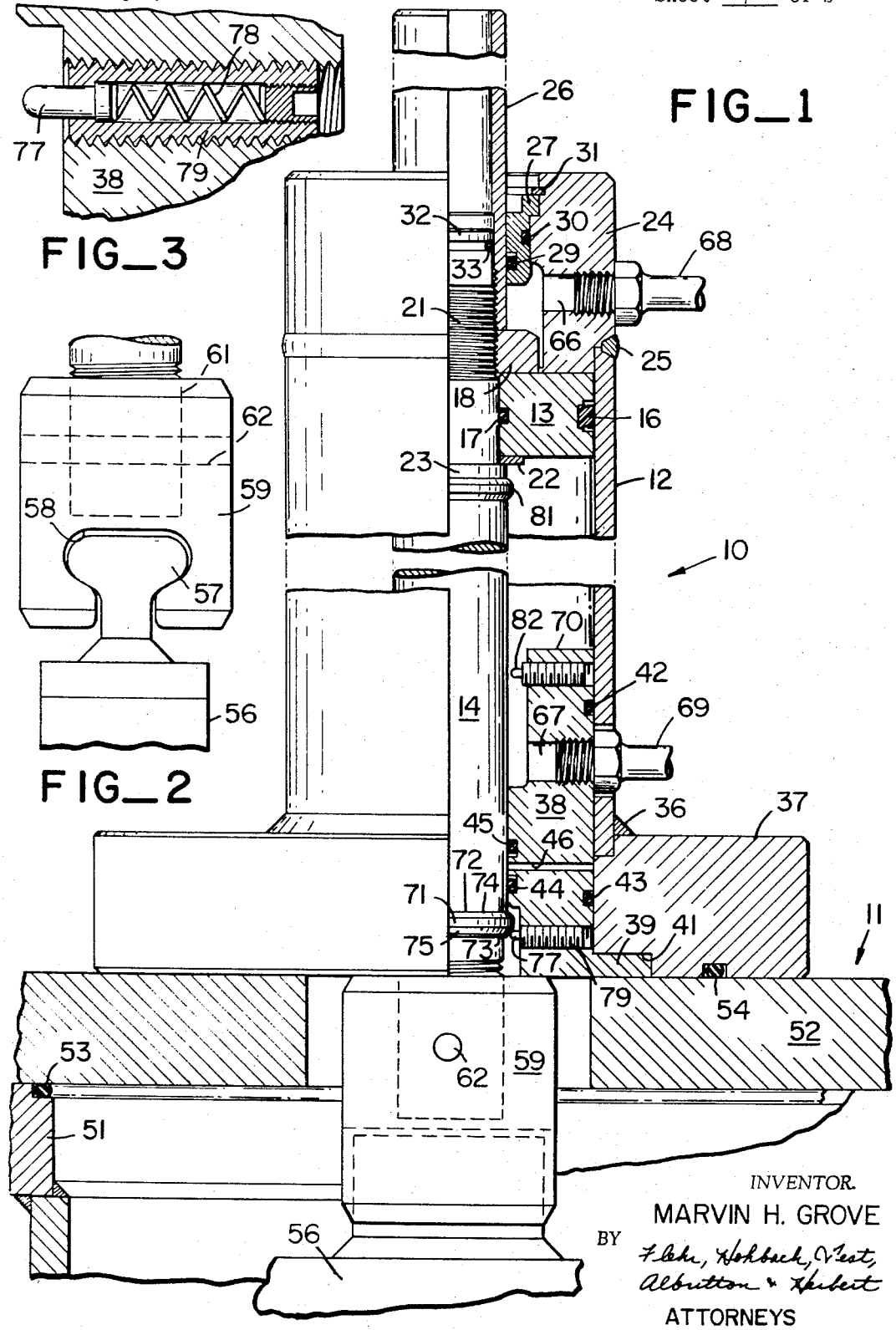
Feb. 25, 1969  M. H. GROVE  3,429,550
VALVE EQUIPMENT WITH HYDRAULIC OPERATOR
Filed May 3, 1967  Sheet 1 of 2
INVENTOR.
MARVIN H. GROVE
BY
ATTORNEYS Feb. 25, 1969   M. H. GROVE   3,429,550
VALVE EQUIPMENT WITH HYDRAULIC OPERATOR
Filed May 3, 1967
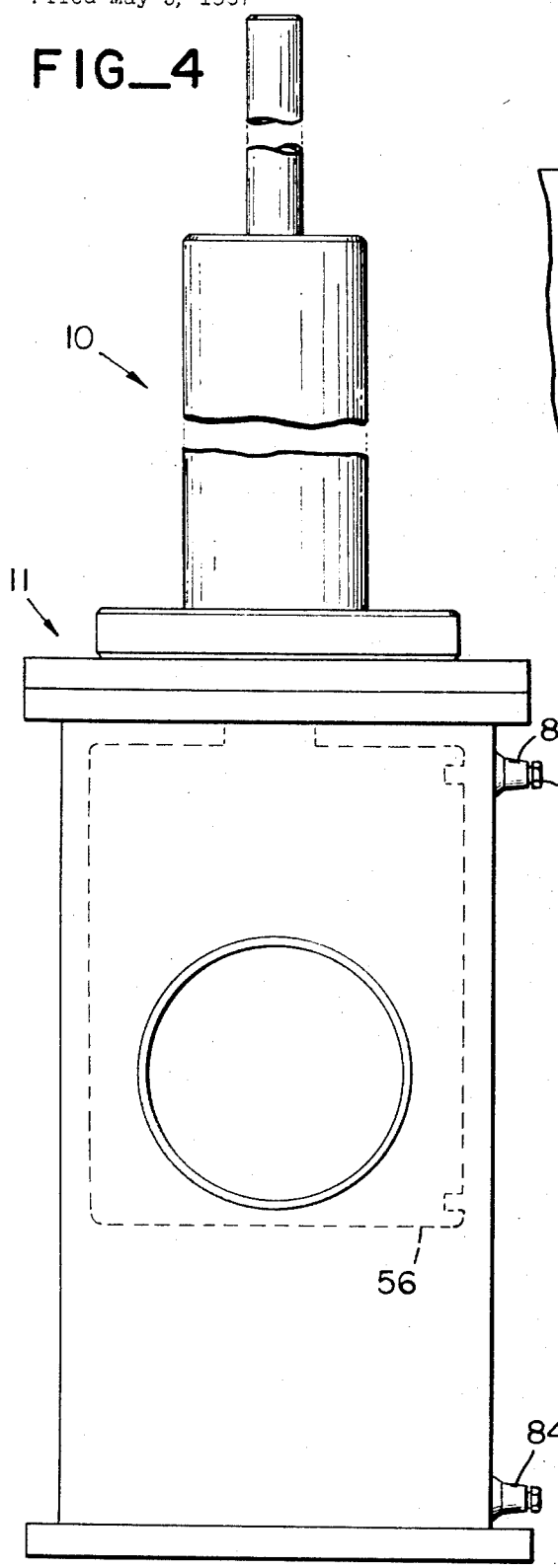
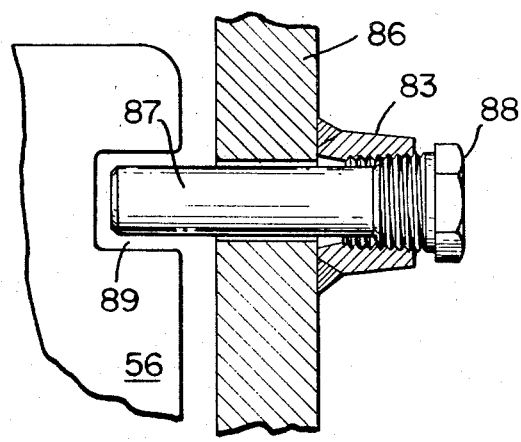
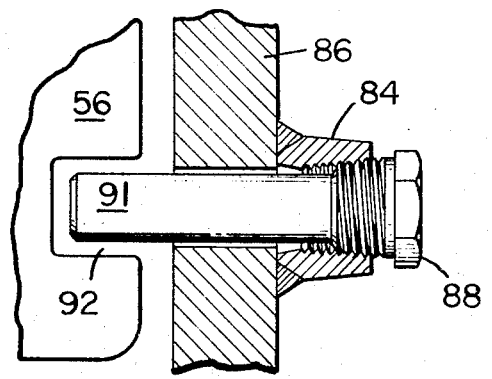
INVENTOR.
MARVIN H. GROVE
ATTORNEYS

3,429,550
VALVE EQUIPMENT WITH HYDRAULIC OPERATOR
Marvin H. Grove, Piedmont, Calif., assignor to M & J Valve Company, Houston, Tex., a corporation of Delaware
Filed May 3, 1967, Ser. No. 635,834
U.S. Cl. 251—31                    3 Claims
Int. Cl. F16k 31/143, 35/04

ABSTRACT OF THE DISCLOSURE

Gate valve equipment including a double-acting hydraulic operator of the piston-cylinder type. The operator assembly has mechanical detent means which when the operator is assembled with a gate valve serves to lock or retain the gate in at least one operating position.

---

This invention relates generally to gate valve equipment of the type in which a double-acting operator is directly mounted upon the body of a gate valve and is operatively connected to the gate whereby upon application of hydraulic fluid the valve is power operated between full open and closed positions.

Installations of gate valves with hydraulic operators are generally such that the valve is in vertical position, with movement of the gate between upper full open position and lower closed position. In many instances, such as pipe line service, the valve is of such size that the gate is relatively heavy and may drop down by its own weight to the lower closed position, particularly if jarred or vibrated. Assuming that the hydraulic operator is of the double-acting piston-cylinder type, fluid connections are established to the ends of the cylinder, and during operation fluid under pressure is supplied to one end of the cylinder and exhausted from the other. To provide a hydraulic lock it is customary to install special check valve means in these connections, whereby when the piston is in its uppermost position and application of fluid pressure to the lower side of the piston is discontinued, liquid is trapped in the space below the piston, thus holding the piston against downward movement under the weight of the gate. While such a hydraulic lock functions to prevent movement of the gate, it is subject to the hazard that if the hydraulic connections are broken through accident, or if leakage should occur, the piston is no longer locked in one position. Aside from possible movement of the gate because of its weight, it may also under certain operating conditions be subjected to forces tending to move it upwardly. Such a condition may exist when there is a relatively high line pressure within the body and where the fluid pressure area presented by the operating rod of the valve is sufficient to move the operating rod and the gate upwardly.

In general it is an object of the present invention to provide valve equipment of the above character having double-acting hydraulic means and which incorporates mechanical locking means for retaining the gate in its uppermost position.

Another object of the invention is to provide apparatus of the above character having detent or locking means incorporated in a unitary assembly which includes a piston-cylinder operator.

Summary of the invention

Valve equipment consisting of a double-acting hydraulic operator adapted to be mounted on a valve of the type having a gate movable vertically between upper full open and lower closed positions. The operator assembly consists of a cylinder having means at its lower end for mounting upon the body of a gate valve, and also having a piston movably fitted within the cylinder. An operating rod connects the piston with the gate of the valve, whereby movement of the piston from one end of the cylinder to the other under the urge of hydraulic pressure moves the gate between upper full open and lower closed positions. The assembly also includes mechanical locking or detent means for retaining the operating rod and the gate in its upper full open position when hydraulic pressure is not being supplied to the cylinder. In its preferred form additional locking or detent means retains the gate in its lower closed position.

Referring to the drawing:
FIGURE 1 is a side elevational view illustrating equipment incorporating the present invention and in half section;
FIGURE 2 is a detail illustrating the connection between the operating rod and the valve gate;
FIGURE 3 is an enlarged detail illustrating a suitable construction for a detent;
FIGURE 4 is an end view illustrating a gate valve equipped with a hydraulic operator and provided with positive locking means;
FIGURE 5 is a detail in section illustrating positive locking means for retaining the gate in full open position; and
FIGURE 6 is a detail in section illustrating positive locking means for retaining the gate in closed position.

Description of the preferred embodiments

FIGURE 1 illustrates a double-acting hydraulic operator assembly 10 mounted upon a gate valve 11. The gate valve may be of the type having a fabricated box-like body, such as disclosed in Grove 3,260,503. The gate for such a valve is in the form of a flat plate or slab, and the sealing means engaging the gate may be of the type disclosed in Grove 3,269,695. As previously explained, when such a gate valve is mounted in vertical position, the gate may move downwardly to closed position by virtue of its weight, particularly when jarred or vibrated, unless it is locked or otherwise restrained.

The hydraulic operator 10 is of the double-acting piston-cylinder type. The upright cylinder 12 is fitted with the movable piston 13, which in turn is secured to the vertical operating rod 14. The piston is shown provided with a suitable seal ring 16, and is sealed with respect to the operating rod 14 by suitable means such as the seal ring 17 of the resilient O-ring type. It is held between a collar 18 that is carried by the threaded portion 21 of the operating rod, and a ring 22 which engages a shoulder 23 of the operating rod.

A head closure 24 is secured to the upper end of the cylinder, as by weld connection 25, and forms an upper abutment for the piston 13. A tube 26 has its lower end attached to the threaded end 21 of the operating rod and extends vertically through the head closure 24. In effect this tube is an upper extension of the rod. It is sealed with respect to the closure 24 by suitable means, such as the bushing 27 which is provided with the inner seal ring 29 that engages the tube 26, and an external seal ring 30 for preventing leakage between the bushing and the closure 24. This bushing is held in place by suitable means such as the snap-in ring 31. The operating rod has an extension 32 above the threaded portion 21, and this is sealed with respect to tube 26 by suitable means such as the resilient O-ring 33.

The lower end of the cylinder is secured as by weld connection 36 with the mounting flange 37. It is also fitted with a closure 38 which has a lower flange 39 accommodated within the recess 41 provided in flange 37. The closure 38 is sealed with respect to the lower portion of the cylinder and the flange 37 by suitable means such as the resilient O-rings 42 and 43. Also the closure is sealed with respect to the operating rod 14 by suitable means such as the vertically spaced resilient O-rings 44 and 45. The space between the latter rings may be vented to the atmosphere through duct 46.

In practice the mounting flange 37 is suitably attached to the upper end of the valve body. In FIGURE 1 the valve body has been illustrated as being of the fabricated type. It is box-like or rectangular in section with flat side and end walls that are secured at their upper ends to the flange 51. A plate 52 is seated upon flange 51 and the mounting flange 37 of the cylinder is disposed upon plate 52. These parts are securely clamped together as by means of suitable bolting (not shown) and gaskets or seal rings 53 and 54 are provided to prevent leakage.

The slab-like valve gate 56 indicated in FIGURE 1 has its upper end attached to the lower end of the operating rod 14. This attachment can consist of a T-shaped bar 57 which is secured to the upper end of the gate and which is loosely accommodated within the T-shaped slot 58 formed in the block 59. The block is secured to the lower end of the operating rod by the threaded engagement 61, and these parts are shown locked together by the pin 62. When the gate is in either open or closed position, the attachment between the operating rod and the gate can be disengaged by unbolting the mounting flange 37 and plate 52 from the valve body, and then moving the cylinder assembly together with the block 59 toward one side of the valve or the other to disengage it from the T-bar 57.

The head and base closures 24 and 38 are provided with openings 66 and 67 adapted to be connected with the hydraulic pipe lines 68 and 69. These lines lead to a suitable hydraulic system whereby liquid under pressure can be applied to one line, while liquid is being exhausted from the other. In a typical instance the system may consist of pumping means that is manually or motor operated, together with a four-way valve whereby the position of the valve causes liquid under pressure to be supplied to one end of the cylinder or the other. In many instances the lines 68 and 69 may connect with the hydraulic system through check valve means whereby during periods when the system is not in operation to supply liquid under pressure, the liquid is trapped within the cylinder to provide a hydraulic lock against movement.

In FIGURE 1 the piston is shown at the upper limit of its travel, corresponding to full open valve position. When liquid is supplied through pipe 68 and exhausted from pipe 69, the piston moves downwardly to move the gate toward its lowermost closed position. At the lowermost position the piston 13 comes into abutment with the upper end face 70 of the lower closure 38. Assuming that the valve has been moved to full open position by application of fluid pressure to pipe 69 to act upon the lower side of the piston 13, then after the piston reaches its upper limit and further supply of liquid is discontinued, liquid may be trapped in the space below the piston by the check valve means previously mentioned. However, this type of hydraulic lock is effective only in the event the pipe line 69 and piping is not broken accidentally, or if there is no leakage which prevents gradual escape of the trapped liquid. Assuming that the trapped liquid does escape from the cylinder by leakage or otherwise, then in the absence of any other restraint the gate is apt to move downwardly to closed position, particularly if subjected to jarring or vibration.

The present invention makes use of mechanical locking or detent means which restrains the operating rod 14 and the gate in one position irrespective of the effectiveness of the hydraulic lock referred to above. In FIGURE 1, such a detent means is shown near the lower end of the cylinder assembly. Thus a ring 71 is attached to the operating rod and is retained between the shoulder 72 and the snap-in ring 73. This ring is provided with upper and lower bevelled surfaces 74 and 75.

Mounted within the lower portion of the closure 38, there is a detent pin 77 which is urged toward its projected position by spring 78. As illustrated in FIGURE 3 the pin and the spring may be carried within the bushing 79 which is threaded into the closure 38. The pin 77 has a rounded end as illustrated, and when completely projected, it extends within the path of movement of the ring 71. However it does not extend sufficiently far to contact the periphery of the operating rod 14. When the valve gate is in its uppermost position, the right 71 is immediately above the pin 77, with the pin contacting or adjacent to the lower bevelled surface 75. When liquid under pressure is applied to the upper end of the cylinder, sufficient force can be applied whereby the ring 71 causes the pin 77 to be retracted against the spring 78 by camming action. However, the retention supplied by the pin when engaged with ring 71 as shown in FIGURE 1 is sufficient to prevent the gate from moving downwardly under its own weight to closed position irrespective of shocks or vibrations to which the valve may be subjected. Immediately after the ring 71 has been forced past the detent pin 77, the operating rod continues its downward movement with the pin 77 out of contact with the peripheral surface of the rod, thus avoiding any scoring. When the operator functions to return the valve gate to its raised full open position by application of fluid pressure through pipe 69 and below the piston, the operating rod 14 moves upwardly until the ring 71 strikes the detent pin 77, and thereafter the pin is again retracted and finally returned to the locking or retaining position shown in FIGURE 1.

As previously mentioned, under certain operating conditions forces may act upon the gate and the operating rod tending to move the gate toward open position after the gate has been closed. Therefore I prefer to provide additional detent means to lock or retain the gate in its full closed position. Thus the upper portion of the operating rod 14 has been provided with another ring 81 like ring 71, and the upper portion of the closure 38 has been provided with a second spring pressed detent pin 82 like the pin 71. When the operating rod and piston are moved downwardly to their lower limiting position, the ring 81 passes and engages below the pin 82 as illustrated in dotted lines in FIGURE 1. Thus the valve gate and the operating rod are locked in their lowermost positions.

As illustrated in FIGURES 4–6, it is sometimes desirable to provide the gate valve with positive locking means in addition to detent means incorporated in the hydraulic cylinder assembly. The body of the gate valve in this instance is provided with upper and lower spuds 83 and 84 located on the side wall 86. Normally these spuds are closed by threaded plugs. When it is desired to positively lock the gate in the upper open position, the plug in spud 83 is removed and the pin 87 is inserted, as shown in FIGURE 5. This pin is carried by a threaded fitting 88 that is threaded within the spud 83. The adjacent corner of the gate 56 is provided with an opening or notch 89 into which the pin 87 projects. With this arrangement it is evident that the gate is positively locked in open position.

When it is desired to lock the gate in closed position the plug in spud 84 is removed and a pin 91 is applied in the same manner as the pin 87. Pin 91 engages within a notch or opening 92 in its adjacent corner of the gate.

Positive locking which is made possible by the locking means shown in FIGURES 5 and 6 may be used in instances where it is desired to remove the hydraulic operating assembly without removing the gate valve from the line.

I claim:

1. In valve equipment of the type including a double-acting hydraulic operator adapted to be mounted on the body of a gate valve for power operation of the gate of the valve between full open and closed positions, a hydraulic operator assembly consisting of a vertically disposed cylinder, mounting means for mounting the lower end of the cylinder on the body of a gate valve, a piston movably fitted within the cylinder, an operating rod connected to the piston and adapted to be connected to the gate of the valve whereby movement of the piston from one end of the cylinder to the other serves to move the gate between open and closed positions, a closure fitted into the lower end of the cylinder, means forming a seal between said closure and the operating rod, at least one detent pin slidably carried by the closure, spring means for urging said detent pin toward the operating rod, and a member carried by the operating rod adapted to engage and to be retained by said detent pin when the piston is at one end of the cylinder.

2. Equipment as in claim 1 in which two vertically spaced detent pins are provided, both pins being slidably carried by said closure, and spring means for urging each of said detent pins toward the operating rod, the operating rod having two members carried thereon adapted to engage and to be retained by one or the other of said detent pins when the piston is at one end or the other of the cylinder.

3. In valve equipment of the type including a double-acting hydraulic operator adapted to be mounted on the body of a gate valve for power operation of the gate of the valve between upper full open and lower closed positions, a hydraulic operator assembly consisting of a vertically disposed cylinder, a mounting flange secured to the lower end of the cylinder, said mounting flange serving as means for mounting the cylinder on the body of a gate valve, a piston movably fitted within the cylinder, an operating rod connected to the piston and adapted to be connected to the gate of the valve, whereby movement of the piston from one end of the cylinder to the other serves to move the gate between upper full open and lower closed positions, a closure for the lower end of the cylinder, means forming a seal between said closure and the operating rod, another closure for the upper end of the cylinder, means forming a seal between the upper closure and the operating rod, a first detent pin slidably carried by the lower portion of the lower closure, spring means for urging said detent pin in a direction toward the operating rod, a second detent pin slidably carried by the upper portion of the lower closure, spring means for urging said last named detent pin toward the operating rod, a member carried by the operating rod adapted to engage and to be retained by the first detent pin when the operating rod is moved to move the valve gate to its upper position, and an additional member secured to the operating rod adapted to engage the second detent pin carried by the upper portion of the lower closure member and to be retained thereby when the operating rod is moved downwardly to move the valve gate to its lower closed position.

References Cited

UNITED STATES PATENTS

| 2,081,239 | 5/1937 | Klopfenstein | 92—30 |
| 2,251,323 | 8/1941 | Burke | 92—30 |
| 2,596,532 | 5/1952 | Coolidge et al. | 251—297 X |
| 2,802,483 | 8/1957 | Davis | 251—31 X |

FOREIGN PATENTS 609,728   9/1960   Italy.

ARNOLD ROSENTHAL, *Primary Examiner.*

U.S. Cl. X.R.

251—297; 92—30